(12) United States Patent
Lee et al.

(10) Patent No.: US 10,331,283 B2
(45) Date of Patent: Jun. 25, 2019

(54) METHOD OF REDUCING THE VISIBILITY OF METAL CONDUCTORS IN A CAPACITIVE TOUCH PANEL

(71) Applicant: TPK Touch Solutions (Xiamen) Inc., Xiamen (CN)

(72) Inventors: Yuh-Wen Lee, Hsinchu (TW); Ching-Shan Lin, Tainan (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 15/909,931

(22) Filed: Mar. 1, 2018

(65) Prior Publication Data

US 2018/0188857 A1    Jul. 5, 2018

Related U.S. Application Data

(62) Division of application No. 13/075,197, filed on Mar. 30, 2011, now abandoned.

(30) Foreign Application Priority Data

May 16, 2010 (CN) .......................... 2010 1 0176328

(51) Int. Cl.
  *H05K 3/02* (2006.01)
  *H05K 3/10* (2006.01)
  *G06F 3/044* (2006.01)

(52) U.S. Cl.
  CPC ......... *G06F 3/044* (2013.01); *Y10T 29/49155* (2015.01)

(58) Field of Classification Search
  CPC .. G06F 3/044; G06F 3/0412; Y10T 29/49126; Y10T 29/49155; Y10T 29/4916
  USPC ..................................................... 29/830, 846
  See application file for complete search history.

(56) References Cited

U.S. PATENT DOCUMENTS

| 8,444,448 B2* | 5/2013 | Ishida ................... G06F 3/0412 |
| | | 345/173 |
| 2011/0032207 A1* | 2/2011 | Huang .................... G06F 3/044 |
| | | 345/174 |
| 2011/0267308 A1* | 11/2011 | Park ........................ G06F 3/044 |
| | | 29/846 |

* cited by examiner

*Primary Examiner* — Donghai D Nguyen
(74) *Attorney, Agent, or Firm* — Cooper Legal Group, LLC

(57) ABSTRACT

The present invention discloses a capacitive touch panel, comprises a substantially transparent substrate and a transparent sensing pattern. The transparent sensing pattern, which detects touch signals, is formed on the substantially transparent substrate. The transparent sensing pattern comprises a plurality of conductor cells and at least one metal conductor disposed on the substantially transparent substrate. The at least one metal conductor connects two adjacent conductor cells. At least one low-reflection layer is formed on the at least one metal conductor. The low-reflection layer can reduce the reflected light therefore reducing the visibility of the metal conductors.

20 Claims, 5 Drawing Sheets

METHOD OF REDUCING THE VISIBILITY OF METAL CONDUCTORS IN A CAPACITIVE TOUCH PANEL

CROSS-REFERENCES TO RELATED APPLICATIONS

This application is a Divisional Application of Ser. No. 13/075,197, filed Mar. 30, 2011, now pending, by the present inventors, which is incorporated herein by reference.

FIELD OF THE INVENTION

The present invention relates to a capacitive touch panel with a single layer of transparent conductive structure with low visibility of metal conductors and a method of reducing the visibility of metal conductors in capacitive touch panel.

BACKGROUND OF THE INVENTION

Nowadays, with the development of touch technology, touch panels are widely used in many electronic products, such as cell phones, personal digital assistants (PDAs), game input interfaces, or computer touch screens. The touch panel is always integrated with a display panel. It is convenient for a user to select an option by touching a displayed image on the display panel to start its corresponding operation.

According to different technology principles, there are many types of touch panels, such as resistance touch panel, capacitive touch panel, infrared sensing touch panel, electromagnetic sensing touch panel, and acoustic wave sensing touch panel. Herein, the capacitive touch panel is comparatively better because of its high sensitivity, low cost, and simple structure. Theoretically, the capacitive touch panel works by sensing capacitance of human bodies. When a user touches the capacitive touch panel, partial electric charges will be taken away to generate electrical current signals, which are then sent to a controller. The controller will compute the touch position by using the received signals.

Generally, a conventional capacitive touch panel comprises a substantially transparent substrate, a transparent sensing pattern on the substantially transparent substrate, and a passivation layer. The transparent sensing pattern, for detecting touch signals, comprises a plurality of electrodes disposed on the substantially transparent substrate. The transparent sensing pattern may be formed by coating, etching, or printing a substantially transparent conductive layer which is made of a substantially transparent conductive material, e.g. Indium Tin Oxide (ITO) or antimony tin oxide (ATO). The transparent sensing pattern may comprise a plurality of electrodes with a plurality of conductor cells and electrical conductors connecting two of such conductor cells. These conductor cells may be arranged in many different ways, such as in two perpendicular directions of the right angle coordinate system, in parallel directions, or in radiant-type directions. Among these different ways, the way of running in two directions has two types of arrangements of the conductor cells and the electrical conductors. One is single layer ITO structure and the other is double layer ITO structure. As to the single layer ITO structure, the conductor cells in two directions are disposed on the same layer. As to the double layer ITO structure, the conductor cells are disposed on two different layers.

A capacitive touch panel with single layer ITO structure comprises a substantially transparent substrate, a transparent sensing pattern, an insulating layer and a passivation layer. The passivation layer is an outer layer disposed on the transparent sensing pattern. The transparent sensing pattern comprises a plurality of first electrodes and a plurality of second electrodes respectively disposed on the same side of the substantially transparent substrate in two different directions. The insulating layer comprises a plurality of insulators located at corresponding intersections of the first electrodes and the second electrodes to provide insulation. The electrodes, both the first electrodes and the second electrodes, are connected by electrical conductors at the intersections.

In practice, due to the good conductivity and low cost, metal materials (such as copper or aluminum) are often used to make metal conductors as the electrical conductors in a capacitive touch panel. However, because the metal conductors have a certain width, users can always see the metal conductors in such a transparent environment composed of substantially transparent substrate and transparent sensing pattern. The visibility of metal conductors is not desirable.

Therefore, in the past, two methods have been used to solve the problem of visibility of metal conductors. The first one is to reduce the size of metal conductors and limit the width within a very small value, and the second one is to use transparent conductive material (e.g. ITO) as electrical conductors to replace the metal conductors. However, in practical production, the first method is hard to achieve and cannot eliminate the problem of visibility of metal conductors completely. As to the second method, it is required to add another ITO photo-etching process (including an ITO coating process, a photolithography exposure process and an etching stripping process) and use a higher-cost material (ITO), leading to an obvious increase in the manufacturing costs.

SUMMARY OF THE INVENTION

Therefore, an objective of the present invention is to provide a capacitive touch panel with the low visibility of metal conductors and good optical performance as reflection from the metal conductors is reduced.

Another objective of the present invention is to provide a method of reducing the visibility of metal conductors in capacitive touch panel. The present invention can be practiced as a convenient solution with high yield rate and low cost, and can help achieve better optical performance.

A capacitive touch panel comprises a substantially transparent substrate, and a transparent sensing pattern for detecting touch signals. The transparent sensing pattern comprises at least one metal conductor disposed on the substantially transparent substrate; and at least one low-reflection layer formed on at least one metal conductor.

A method of reducing the visibility of metal conductors in a capacitive touch panel comprises the step of forming a low-reflection layer on the metal conductors. The capacitive touch panel comprises a substantially transparent substrate with a transparent sensing pattern. The transparent sensing pattern comprises at least one metal conductor disposed on the substantially transparent substrate.

The present invention provides the method of coating a low-reflection layer on each metal conductor to reduce the reflected lights from metal conductors. In this way, there is no need to reduce the width of the metal conductor. Also this makes it easier to achieve high yield rate in the manufacturing process. Furthermore, compared to the second method of adding another ITO photo-etching process (including an ITO coating process, a photolithography exposure process and an etching stripping process), the present invention only adds a photolithography exposure process in the original process. Thus, the manufacturing process can be simplified, and the cost can be reduced.

BRIEF DESCRIPTION OF THE DRAWINGS

Skilled persons in the art will understand that the drawings, described below, are for illustration purposes only and do not limit the scope of the present invention in any way. In the drawings, like reference numerals designate corresponding parts throughout the several views.

DETAILED DESCRIPTION OF THE DRAWINGS

Figure 1:
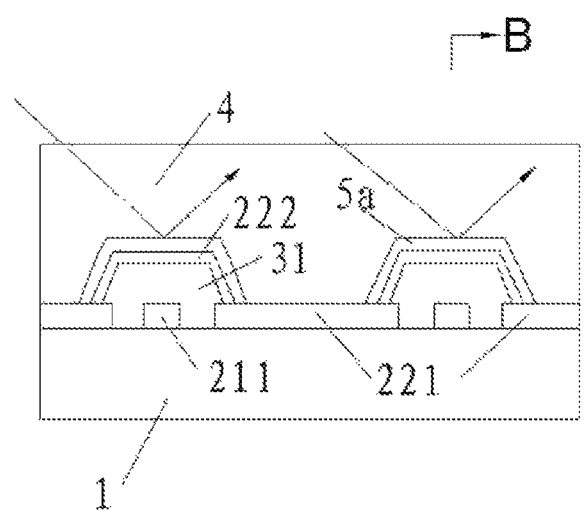
FIG. 1 is a sectional view of first embodiment of the present invention.
Figure 2:
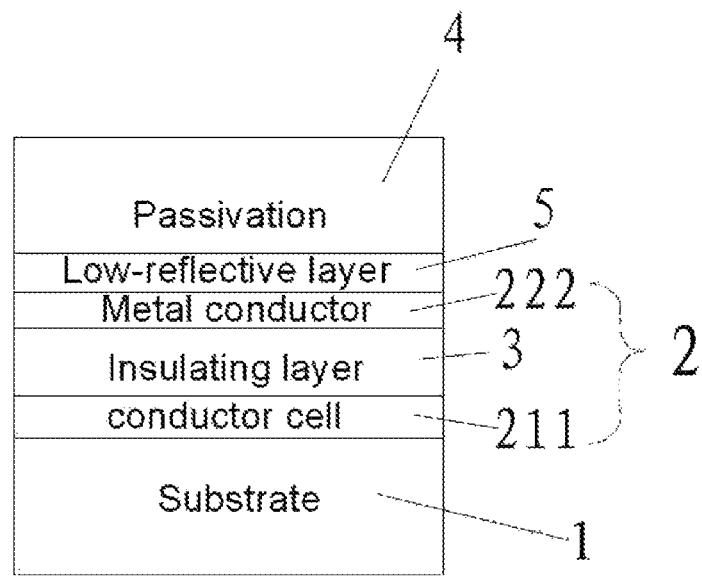
FIG. 2 is a cross-sectional view taken on the line B-B of FIG. 1.
Figure 3:
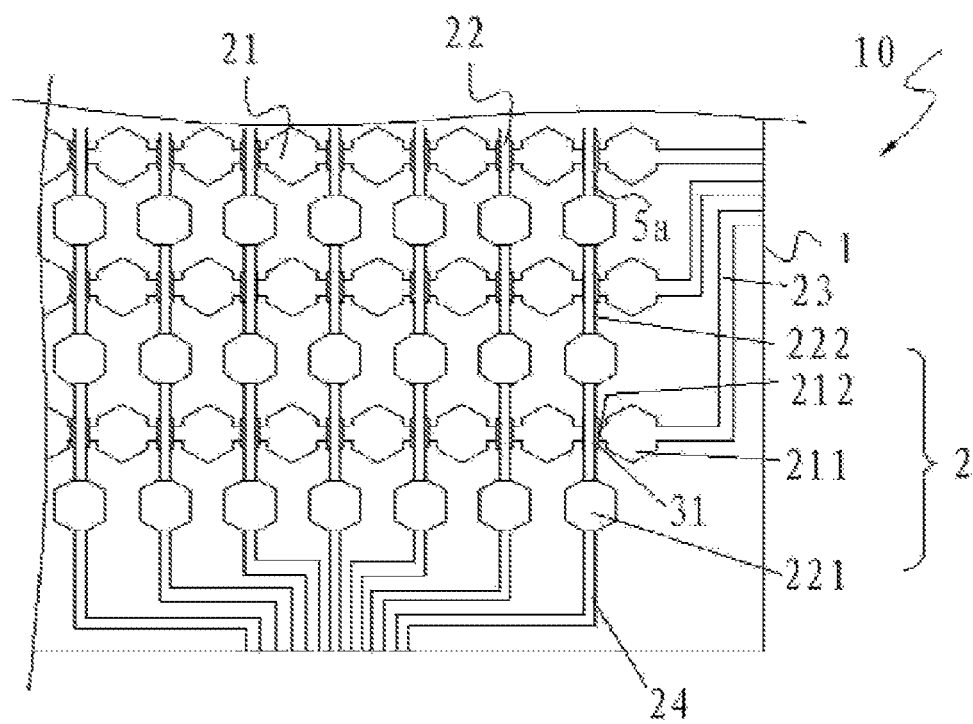
FIG. 3 is a partial plan view of first embodiment of the present invention.

Referring to FIG. 1, FIG. 2 and FIG. 3, a capacitive touch panel 10 in accordance with the first embodiment comprises a substantially transparent substrate 1, a transparent sensing pattern 2, an insulating layer 3, a passivation layer 4 and a low-reflection layer 5. The transparent sensing pattern 2 detects touch signals. It is formed on the substantially transparent substrate 1. The transparent sensing pattern 2 comprises a plurality of first electrodes 21 and second electrodes 22 arranged in two directions respectively and disposed on the same side of the substantially transparent substrate 1. Generally, the first direction may be perpendicular to the second one. The insulating layer 3 comprises a plurality of insulators 31. It is located at corresponding intersections of the first electrodes 21 and the second electrodes 22 to provide insulation. The passivation layer 4 is an outer layer disposed on the transparent sensing pattern 2.

Furthermore, each first electrode 21 comprises a plurality of first conductor cells 211 and a plurality of first electrical conductors 212, wherein each first electrical conductor 212 connects two adjacent first conductor cells 211. Each second electrode 22 comprises a plurality of second conductor cells 221 and a plurality of second electrical conductors 222, wherein each second electrical conductor 222 connects two adjacent second conductor cells 221. The second electrical conductors 222 and the first electrical conductors 212 are insulated via the insulators 31. In this embodiment, the second electrical conductors 222 are metal conductors made of metal conductive materials, such as silver, copper or aluminum. The low-reflection layer 5 comprises a plurality of low-reflection strips 5a disposed on each second electrical conductor 222, as shown in FIG. 1 and FIG. 2. The reflectivity of the low-reflection layer 5 is less than about 80%. The low-reflection layer 5 can reduce the reflected light therefore reducing the visibility of the metal conductors. This embodiment provides a capacitive touch panel with better optical performance.

The low-reflection layer 5 can be made of oxide material, nitride material, a mixture of oxide and nitride material, a dark UV-sensitive organic material, etc. The oxide material may be metal oxide, such as chromium oxide (CrO), titanium oxide (TiO) or zirconium oxide (ZrO). The nitride material may be metal nitride, such as chromium nitride (CrN), titanium nitride (TiN) or zirconium nitride (ZrN). The dark UV-sensitive organic material may be brown, gray, or black photoresist.

The first conductor cells 211, the second conductor cells 221 and the first electrical conductors 212 are made of a substantially transparent conductive material, such as Indium Tin Oxide (ITO) or antimony tin oxide (ATO). The insulating layer is made of transparent insulation material, such as silica.

The capacitive touch panel further comprises a processing circuit (not shown) for receiving and processing the touch signals and a plurality of metal traces for carrying the touch signals to the processing circuit. The metal traces are metal conductors and comprise a plurality of first metal traces 23 and second metal traces 24, as shown in FIG. 3. The first metal traces 23 connect the first electrodes 21 to the processing circuit. The second metal traces 24 connect the second electrodes 22 to the processing circuit.

In this section, a manufacturing process of making the capacitive touch panel in accordance with the first embodiment will be depicted. The manufacturing method includes the following steps.

Figure 4:
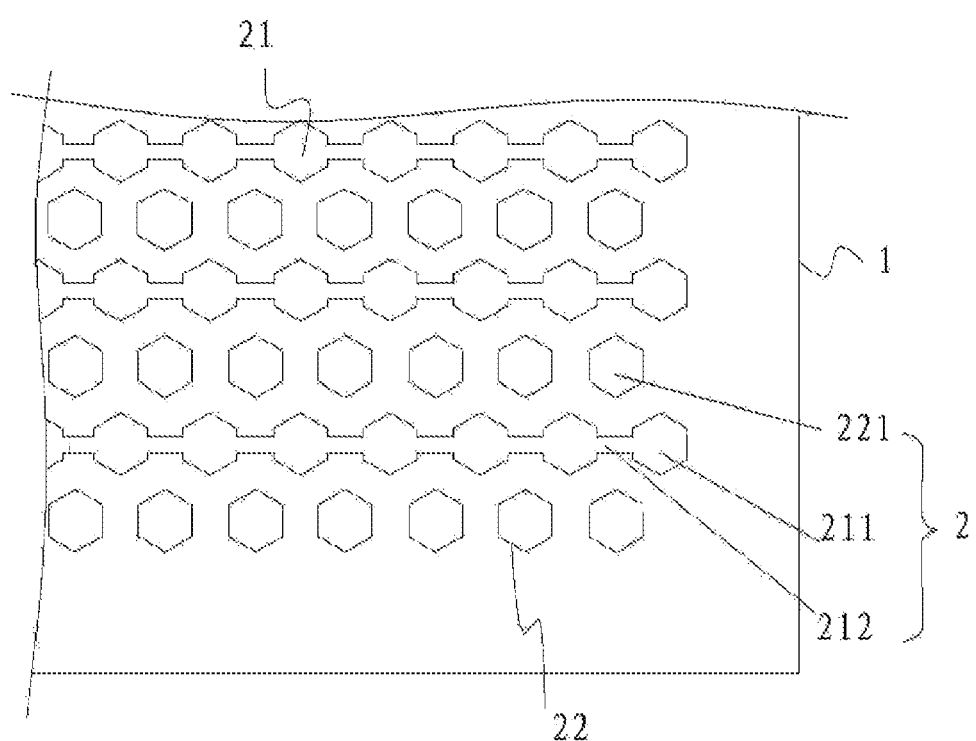
FIG. 4 is a partial plan view of the transparent sensing pattern structure with a plurality of first conductor cells, second conductor cells and first electrical conductors on the substantially transparent substrate.

Step 1, referring to FIG. 4, a sensing pattern 2 is formed on the substantially transparent substrate 1. More specifically, Step 1 further comprises: coating a transparent conductive material layer on a substantially transparent substrate 1, and etching the transparent conductive material layer to form a plurality of first conductor cells 211 and a plurality of second conductor cells 221 respectively and a plurality of first electrical conductors 212. Each first electrical conductor 212 connects two adjacent first conductor cells 211.

Figure 5:
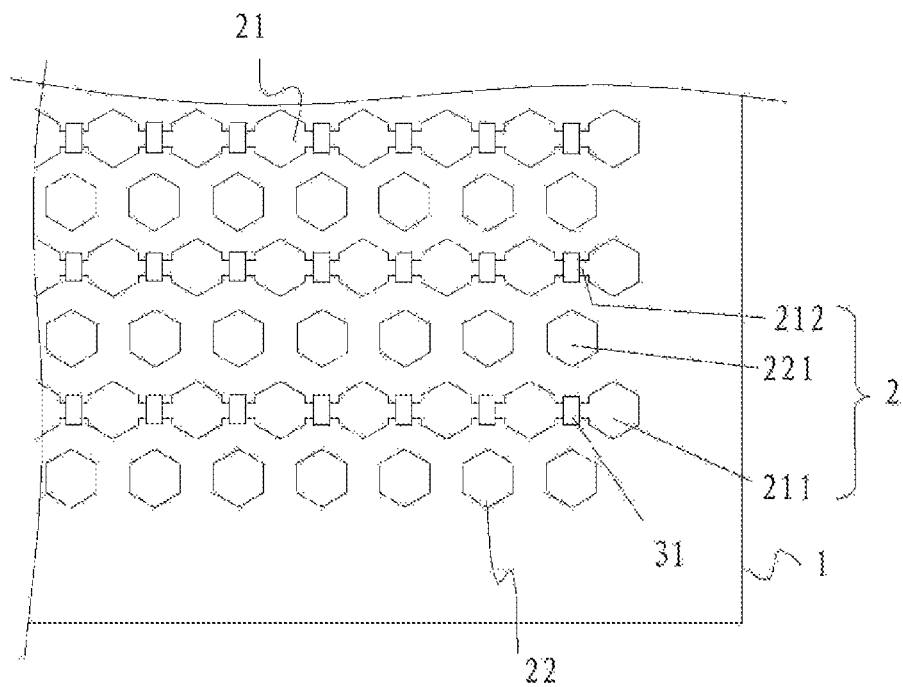
FIG. 5 is a partial plan view of the transparent sensing pattern structure with the insulating layer on the first electrical conductors.

Step 2, referring to FIG. 5, a plurality of insulators 31 is formed on the sensing pattern 2. More specifically, this step further comprises: coating a insulating layer 3 on the sensing pattern 2 and etching the insulating layer 3 to form a plurality of insulators 31 on the corresponding first electrical conductor 212.

Step 3, referring to FIG. 3, a plurality of second electrical conductors 222 is formed on the insulators 31 as well as the low-reflection strips 5a. The second electrical conductors 222 are metal conductors with good conductivity and connect between two adjacent second conductor cells 221. There are three kinds of methods to execute Step 3.

The first method comprises: coating a metal layer on the substantially transparent substrate; coating a low-reflection layer 5 made of either metal nitride material or metal oxide material on the metal layer by Physical Vapor Deposition (PVD) sputter coating; and etching the low-reflection layer 5 and the metal layer at the same time by photolithography to form metal conductors as the second electrical conductors 222. After this step is finished, a plurality of low-reflection strips 5a of the low-reflection layer 5 are formed on the metal conductors.

The second method comprises: coating a metal layer on the substantially transparent substrate; coating a low-reflection layer 5 on the metal layer; exposing the low-reflection layer 5 by photolithography to form a plurality of low-reflection strips 5a; and etching the metal layer to form the metal conductors by using the low-reflection strips 5a as etching mask. Thus, the low-reflection strips 5a of the low-reflection layer 5 are disposed on the metal conductors. The low-reflection layer 5 is made of dark UV-sensitive organic material, such as black photoresist.

The third method comprises: coating a metal layer on the substantially transparent substrate; etching the metal layer to form the metal conductors as the second electrical conductors 222; coating a low-reflection layer 5 on the metal conductors; and exposing the low-reflection layer 5 by photolithography to form the low-reflection strips 5a. After this step is finished, a plurality of low-reflection strips 5a of the low-reflection layer 5 are formed on the metal conductors. The low-reflection layer 5 is made of dark UV-sensitive organic material, such as black photoresist.

Step 4, a passivation layer 4 is coated on the transparent sensing pattern 2.

As described above, the step 1 and step 3 of the manufacturing process can be exchanged. And the quantity of the first electrodes and the second electrodes can be increased or decreased according to the resolution of capacitive touch panel.

In the same way, a low-reflection layer 5 can be formed on the first metal traces 23 and the second metal traces 24 to reduce the visibility of the metal traces.

Figure 6:
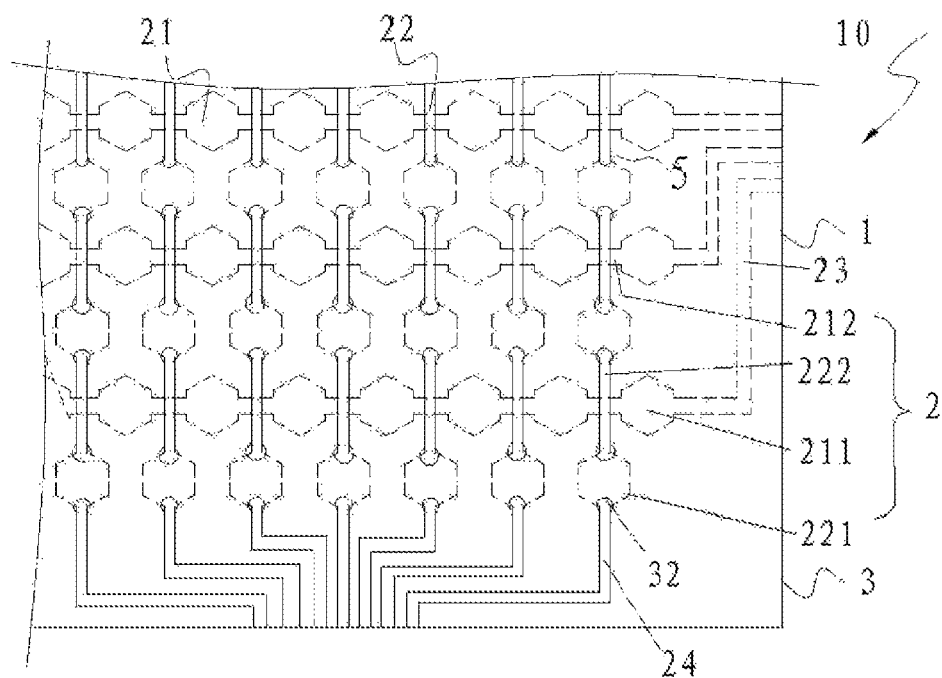
FIG. 6 is a partial plan perspective view of second embodiment of the present invention.
Figure 7:
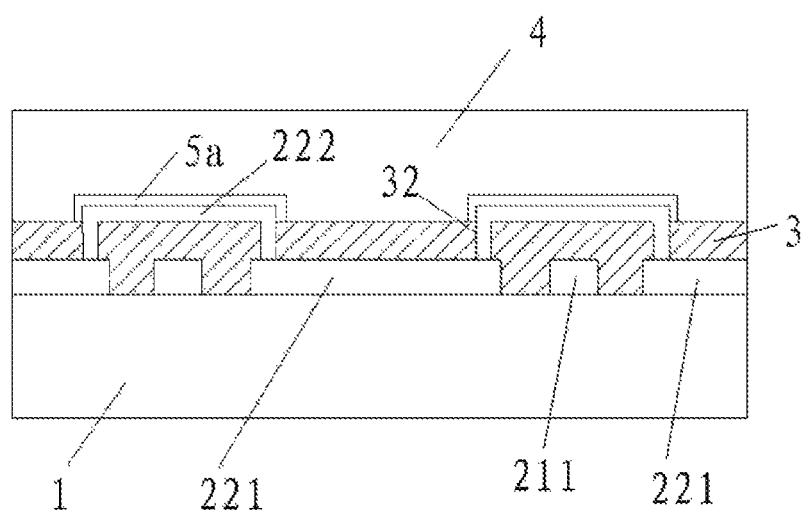
FIG. 7 is a sectional view of second embodiment of the present invention.

Referring to FIG. 6 and FIG. 7, a capacitive touch panel 10 in accordance with the second embodiment comprises a substantially transparent substrate 1, a transparent sensing pattern 2, an insulating layer 3, a passivation layer 4 and a low-reflection layer 5. The transparent sensing pattern 2 is disposed on the substantially transparent substrate 1. The transparent sensing pattern 2 comprises a plurality of first electrodes 21 and a plurality of second electrodes 22 respectively disposed on the same layer in two directions. Each first electrode 21 comprises a plurality of first conductor cells 211 and a plurality of first electrical conductors 212 which connect two adjacent first conductor cells 211 of the same electrode. Each second electrode 22 comprises a plurality of second conductor cells 221. The insulating layer 3 comprises a plurality of through holes 32 and covers the transparent sensing pattern 2. A plurality of second electrical conductors 222 are disposed on the other surface of the insulating layer 3 and connect two adjacent second conductor cells 221 via through holes 32. In this embodiment, the second electrical conductors 222 are also metal conductors made of metal conductive materials, such as silver, copper or aluminum. The low-reflection layer 5 comprises a plurality of low-reflection strips 5a disposed on each second electrical conductor 222. The reflectivity of the low-reflection layer 5 is less than about 80%. The low-reflection layer 5 can reduce the reflected light therefore reducing the visibility of the metal conductors. This embodiment provides a capacitive touch panel with better optical performance.

The capacitive touch panel further comprises a processing circuit (not shown) for receiving and processing the touch signals and a plurality of metal traces for carrying the touch signals to the processing circuit. The metal traces are metal conductors and comprise a plurality of first metal traces 23 and a plurality of second metal traces 24, as shown in FIG. 6. The first metal traces 23 connect the first electrodes 21 to the processing circuit. The second metal traces 24 connect the second electrodes 22 to the processing circuit.

The manufacturing process of the second embodiment is similar to that of the first embodiment as described. The difference between these two embodiments is the way of setting the insulating layer.

Although certain embodiments of the present invention have been fully described with reference to the accompanying drawings, it is to be noted that various changes and modifications will become apparent to those skilled in the art. Such changes and modifications are to be understood as being included within the scope of embodiments of this invention as defined by the appended claims. It is to be understood that the present invention has been described by way of illustration and not limitations.

What is claimed is:

1. A method of reducing the visibility of metal conductors in a capacitive touch panel, comprising:
providing a substantially transparent substrate;
providing a plurality of first conductor cells arranged in a first direction, a plurality of second conductor cells arranged in a second direction and a plurality of first electrical conductors disposed on the substantially transparent substrate, wherein each of the first electrical conductors connects adjacent first conductor cells of the plurality of first conductor cells;
providing a plurality of insulators, wherein each of the insulators is disposed on a corresponding first electrical conductor of the plurality of first electrical conductors;
providing a plurality of second electrical conductors, wherein each of the second electrical conductors is disposed on a corresponding insulator of the plurality of insulators, and each of the second electrical conductors connects adjacent second conductor cells of the plurality of second conductor cells; and
providing a low-reflection strip on each of the plurality of second electrical conductors,
wherein the providing a plurality of second electrical conductors and the providing a low-reflection layer on each of the plurality of second electrical conductors comprise:
coating a metal layer on the substantially transparent substrate;
coating a low-reflection layer on the metal layer; and
etching the metal layer and the low-reflection layer at the same time by photolithography, resulting in the low-reflection strip formed on the corresponding one of the second electrical conductors.

2. The method according to claim 1, wherein the low-reflection strip is made of oxide material or nitride material.

3. The method according to claim 2, wherein the oxide material comprises chromium oxide, titanium oxide or zirconium oxide.

4. The method according to claim 2, wherein the nitride material comprises chromium nitride, titanium nitride or zirconium nitride.

5. The method according to claim 1, wherein the low-reflection strip is made of a dark UV-sensitive organic material.

6. The method according to claim 5, wherein the dark UV-sensitive organic material comprises a brown photoresist, a gray photoresist, or a black photoresist.

7. The method according to claim 1, further comprising providing a passivation layer disposed on the substantially transparent substrate.

8. The method according to claim 1, further comprising providing a plurality of metal traces disposed on a peripheral region.

9. The method according to claim 8, wherein the low-reflection strip is further disposed on each of the metal traces.

10. The method according to claim 8, wherein the plurality of metal traces and the plurality of second electrical conductors are made of non-transparent metal materials.

11. The method according to claim 1, wherein the providing a plurality of first conductor cells arranged in a first direction, a plurality of second conductor cells arranged in a second direction and a plurality of first electrical conductors disposed on the substantially transparent substrate comprise:

coating a transparent conductive material layer on the substantially transparent substrate; and etching the transparent conductive material layer to form the plurality of first conductor cells, the plurality of second conductor cells, and plurality of first electrical conductors.

12. The method according to claim 1, wherein the providing a plurality of insulators comprises:

coating an insulating layer on the substantially transparent substrate; and etching the insulating layer to form the plurality of insulators each disposed on the corresponding first electrical conductor of the plurality of first electrical conductors.

13. The method according to claim 12, wherein the insulating layer is made of a transparent insulation material.

14. A method of reducing the visibility of metal conductors in a capacitive touch panel, comprising:

providing a substantially transparent substrate;

providing a plurality of first conductor cells arranged in a first direction, a plurality of second conductor cells arranged in a second direction and a plurality of first electrical conductors disposed on the substantially transparent substrate, wherein each of the first electrical conductors connects adjacent first conductor cells of the plurality of first conductor cells;

providing a plurality of insulators, wherein each of the insulators is disposed on a corresponding first electrical conductor of the plurality of first electrical conductors;

providing a plurality of second electrical conductors, wherein each of the second electrical conductors is disposed on a corresponding insulator of the plurality of insulators, and each of the second electrical conductors connects adjacent second conductor cells of the plurality of second conductor cells; and providing a low-reflection strip on each of the plurality of second electrical conductors, wherein the providing a plurality of second electrical conductors and the providing a low-reflection layer on each of the plurality of second electrical conductors comprises:

coating a metal layer on a substantially transparent substrate;

coating a UV-sensitive organic material as a low-reflection layer on the metal layer;

exposing the low-reflection layer by photolithography and removing a part of the low-reflection layer to form the low-reflection strip; and etching the metal layer by using the exposed low-reflection layer as an etching mask to form the plurality of second electrical conductors.

15. The method according to claim 14, further comprising providing a passivation layer disposed on the substantially transparent substrate.

16. The method according to claim 14, further comprising providing a plurality of metal traces disposed on a peripheral region.

17. The method according to claim 16, wherein the low-reflection strip is further disposed on each of the metal traces.

18. The method according to claim 16, wherein the plurality of metal traces and the plurality of second electrical conductors are made of non-transparent metal materials.

19. The method according to claim 14, wherein the providing a plurality of first conductor cells arranged in a first direction, a plurality of second conductor cells arranged in a second direction and a plurality of first electrical conductors disposed on the substantially transparent substrate comprise:

coating a transparent conductive material layer on the substantially transparent substrate; and etching the transparent conductive material layer to form the plurality of first conductor cells, the plurality of second conductor cells, and plurality of first electrical conductors.

20. The method according to claim 14, wherein the providing a plurality of insulators comprises:

coating an insulating layer on the substantially transparent substrate; and etching the insulating layer to form the plurality of insulators each disposed on the corresponding first electrical conductor of the plurality of first electrical conductors.

* * * * *